(12) United States Patent
Chen

(10) Patent No.: US 7,669,211 B2
(45) Date of Patent: Feb. 23, 2010

(54) DEVICE FOR EJECTING A DISC FORM A DISC PLAYER

(75) Inventor: Yung Ta Chen, Shenzhen (CN)

(73) Assignee: Valley Wood Electrical (Shen Zhen) Co., Ltd, Shenzhen (CN)

( * ) Notice: Subject to any disclaimer, the term of this patent is extended or adjusted under 35 U.S.C. 154(b) by 435 days.

(21) Appl. No.: 11/377,880

(22) Filed: Mar. 16, 2006

(65) Prior Publication Data

US 2006/0209662 A1 Sep. 21, 2006

(30) Foreign Application Priority Data

Mar. 17, 2005 (CN) .................. 2005 1 0033720

(51) Int. Cl.
*G11B 17/028* (2006.01)
*G11B 17/04* (2006.01)
(52) U.S. Cl. ....................... 720/714; 720/712
(58) Field of Classification Search ................ 720/619, 720/695, 706–714, 703; 360/98.07–98.08, 360/99.04–99.05, 99.08–99.12; G11B 17/04, G11B 17/028
See application file for complete search history.

(56) References Cited

U.S. PATENT DOCUMENTS 5,452,280 A * 9/1995 Yamamori et al. .......... 720/604
5,831,790 A * 11/1998 Iftikar et al. ................ 720/706
6,577,580 B2 * 6/2003 Haga ......................... 720/619
6,845,511 B2 * 1/2005 Kuo et al. ................... 720/706

* cited by examiner

*Primary Examiner*—Andrea L Wellington
*Assistant Examiner*—Nathan Danielsen
(74) *Attorney, Agent, or Firm*—Husch Blackwell Sanders Welsh & Katz

(57) ABSTRACT

A disk-chucking device comprises a pressing member including a circular groove which is provided around a circumference of the clamp member, and a clamping member mounted on a turning plate for clasping the circular groove of the pressing member. The turning plate provides a through hole at the center thereof which allows the pressing member passing through, and a plurality of first notch portions disposed along the circumference of the through hole. The turning plate is slidably connected to a mounting board through the clamping member. The turning plate can rotate with respect to the mounting board to move the pressing member vertically. Thus, the pressing member can be pressed onto and removed from a disk support of the displayer according to the rotation of the turning plate. The present disk-chucking device can chuck the disk securely regardless of the position of the disk player.

5 Claims, 11 Drawing Sheets

DEVICE FOR EJECTING A DISC FORM A DISC PLAYER

CROSS REFERENCE OF RELATED APPLICATIONS

This application claims the benefit of Chinese patent application No. 200510033720.9 filed Mar. 17, 2005 which is explicitly incorporated by reference in its entity.

TECHNICAL FIELD OF THE INVENTION

The present invention relates to a disk-chucking device, and more particular, to a disk-chucking device comprising a pressing member having a circular groove provided around a circumference of the pressing member in the height direction thereof, and a clamping member which can removably clamp the circular groove of the pressing member.

BACKGROUND OF THE INVENTION

When a conventional disk player plays a disk, firstly, the disk is inserted into an entrance; secondly, the disk is introduced into an inner portion of the player; and thirdly, the disk is disposed onto a disk support. For example, a car disk player always employs such a kind of disk players. However, the conventional disk player fails to consider a specific position of the disk player. Moreover, the conventional car disk player usually employs a spring or an elastic part but not a permanent magnet which is usually used in a household disk player to chuck the disk onto the disk support. Thus, if one wants to use a disk player having a permanent magnet to secure the disk onto the disk support, it is necessary to consider the position of the disk player.

Currently, a disk-chucking device for chucking the disk onto the disk support is available in the market. The disk-chucking device comprises a clamp member including a permanent magnet therewithin. The clamp member is embedded into a support hole of a support board. Since the clamp member is enclosed by the support hole, the diameter of the support hole must be larger than the diameter of a clamp member in order to ensure that the clamp member can be turned freely. Therefore, when chucking a disk by using the above disk-chucking device, the center of the disk is easy to deviate from the center of the disk support. Even though some disk-chucking devices having a variable support hole which can be opened or closed corresponding to the introduction of the disk is present in the market, however, theses disk-chucking devices can not play disks with different sizes.

SUMMARY OF THE INVENTION

The present invention is provided to overcome the above-mentioned problems in the prior art by providing a disk-chucking device which can chuck disks having different sizes regardless of a loading position thereof. By using the present disk-chucking device, a pressing member of the disk-chucking device can be moved close to a disk support to further chuck a disk onto the disk support while keeping the center of the pressing member aligned with the center of the disk support. Moreover, the chuck of the disk by the pressing member will not hinder a rotation of the disk.

According to an embodiment of the present invention, a disk-chucking device used for a disk player is provided. The disk-chucking device comprises a pressing member providing a first through hole at the center thereof and a circular groove at the side thereof; a turning plate having a second through hole at the center thereof which allows the pressing member passing through, and a plurality of first notch portions disposed along the circumference of the second through hole; a plurality of clamping members mounted on the turning plate at the notch portions respectively, each of the clamping members providing a clip to removably clamp the circular groove of the pressing member; and a mounting board disposed at an upper portion of the disk player, providing a third though hole at its center which is aligned with the second through hole, and defining a plurality of second notch portions to receive the clamping members respectively, wherein the turning plate is slidably connected to the mounting board through the clamping member, the turning plate can rotate with respect to the mounting board, and the pressing member can be pressed onto and removed from a disk support of the displayer according to the rotation of the turning plate.

According to an aspect of the embodiment, the turning plate further provides a first connecting member disposed at a periphery thereof with which the turning plate is engaged to a swivel plate of the disk player, so that the turning plate can be turned by controlling a rotation of the swivel plate.

According to another aspect of the embodiment, the turning plate further provides a second connecting member at a periphery thereof, the second connecting member is connected to an elastic member mounted on the mounting board.

According to another aspect of the embodiment, the turning plate comprises a plurality of supporting portions, a sliding portion of each of the clamping members is disposed on the supporting portion through a shaft of the clamping member, one end of the sliding portion is connected to the clip extending inwards and another end of the sliding portion is connected to an elastic portion which is mounted on the turning board.

According to another aspect of the embodiment, each of the supporting portions comprises a first quadrate support and a second quadrate support, the first quadrate support provides a fixing hole and the second quadrate support provides a channel, and the shaft of the clamping member is inserted into the fixing hole and the channel so that the sliding portion is movable in a direction of the movement of the turning plate.

According to another aspect of the embodiment, an insert is provided extended upwards from the fringe of the second notch portion, the insert is inserted into the first notch portion, and when the turning plate rotates to a place, the insert is barred by the shaft so that the sliding member can release the pressing member onto the disk support.

According to another embodiment of the present invention, a disk-chucking device used for a disk player is provided. The disk-chucking device comprises a pressing member providing a first through hole at the center thereof and a circular groove at the side thereof; a turning plate having a rear portion mounted on a mounting board; and two clamping members engaged with each other being connected to the turning plate, each of the two clamping members providing a clip to removably clamp the circular groove of the pressing member, wherein the turning plate can rotate with respect to the rear portion of the turning plate, which further moves the clips of the clamping members vertically, so that the pressing member clasped by the clips can be pressed onto and removed from a disk support of the displayer.

According to another aspect of the embodiment, the turning plate further comprises a first connecting member and a second connecting member on a side portion thereof through which the turning plate is engaged to a swivel plate of the disk player; so that the turning plate can be turned by controlling a rotation of the swivel plate.

According to another aspect of the embodiment, the disk-chucking device further comprises an elastic member connected to the two clamping members.

According to another aspect of the embodiment, a third connecting member is provided on one of the clamping members, and when the swivel plate rotates to a place, the connecting member is barred by the swivel plate so that the clips of the clamping members can be rotated outwards according to the engagement therebetween, thereby releasing the pressing member onto the disk support.

By using the disk-chucking device of the present invention, the pressing member can be moved close to the disk support while keeping the center of the pressing member aligned with the center of the disk support, then the disk is located onto the disk support, after that the pressing member is released from the clamping member which thereby can be rotated freely. In this manner, the present disk-chucking device can chuck the disk securely regardless of the position of the disk player. In addition, the pressing member will be kept at an immovable state by the clips of the clamping member if the disk is not chucked, so that there is no noise generated even if the disk player is subjected to somewhat vibration. Moreover, the disk-chucking device of the present invention is suitable for disks with different sizes.

DETAILED DESCRIPTION OF THE INVENTION

According to the present invention, the disk-chucking device comprises a pressing member and a clamping member which clamps the pressing member. The pressing member can be moved close to the disk support corresponding to a movement of the clamping member, while keeping a center of the clamp member aligned with a center of the disk support.

The disk-chucking device of the present invention will now be described with reference to the drawings.

Figure 1:
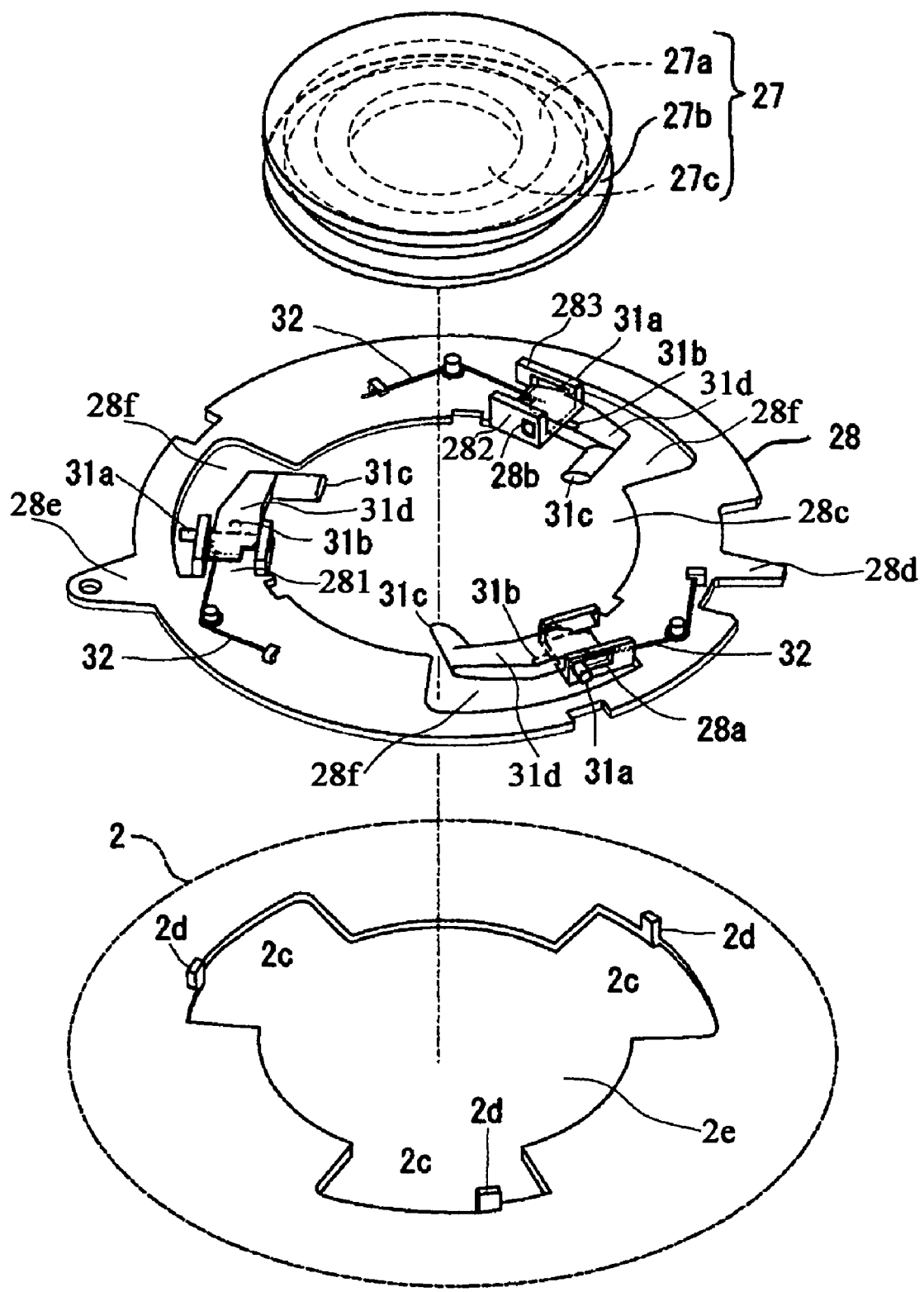
FIG. 1 is an exploded perspective view of a disk-chucking device according to a first embodiment of the present invention.

Referring to FIG. 1, the disk-chucking device of an embodiment comprises a pressing member 27, a second turning palate 28, and a mounting board 2. The pressing member 27 comprises a permanent magnet 27a which is provided within the pressing member 27, a circular groove 27b which is provided around a circumference of the pressing member 27, and a first through hole 27c at the center of the pressing member 27 for receiving a center column of the disk support. The second turning plate 28 (circular turning plate) is provided at the center of a mounting board 2. The second turning plate 28 comprises a second through hole 28c at the center plate thereof for receiving the pressing member 27, three first notch portions 28f provided along the circumference of the second through hole 28c, three supporting portion 281 respectively disposed at the first notch portions 28f. Each of the supporting portion 281 comprises a first quadrate support 282 providing a fixing hole 28b and a second quadrate support 283 providing a channel 28a.

Three clamping members 31 are mounted on the supporting portions 281. Each clamping member 31 comprises a shaft 31a, and a sliding portion 31d on which a contacting part 31b is provided. The contacting part 31b is contact with a surface of the mounting board 2. The shaft 31a is inserted into the fixing hole 28b and the channel 28a of the supporting portion 218, so that the clamping members 31 is movably mounted on the second turning plate 28.

A rod spring 32 (a first elastic member) is mounted on the second turning plate 28 with an spring end 32a connected to the sliding portion 31d, which provides a force to urge a clip 31c of each clamping member 31 to clasp the circular groove 27b and another force to urge the pressing member 27 to approach to the disk support. Three second notch portions 2c (cut portion) are formed around a third through hole 2e at the center of the mounting board 2 for receiving the clamping members 31, and three insert 2d which can respectively engage with the clamping members 31 are provided at fringes of the three second notch portions 2c, respectively.

In order to ensure that the clip 31c of each of the clamping members 31 can be released from the circular groove 27b of the pressing member 27, the fixing hole 28b is configured to be a square-shaped or round-shaped hole and the channel 28a is configured to be a long hole extending parallel to a rotating direction of the second turning plate 28, so that the support shaft 31a can be moved within the channel 28a while fixed in the fixing hole 28b.

The second turning plate 28 further comprises a first connecting member 28d which is engaged with a swivel plate 29 connected to the mounting board 2, and a second connecting member 28e at an outside thereof opposite to the first connecting member 28d to connect the mounting board 2 by a resilient spring 30 (a second elastic member).

Figure 2A:
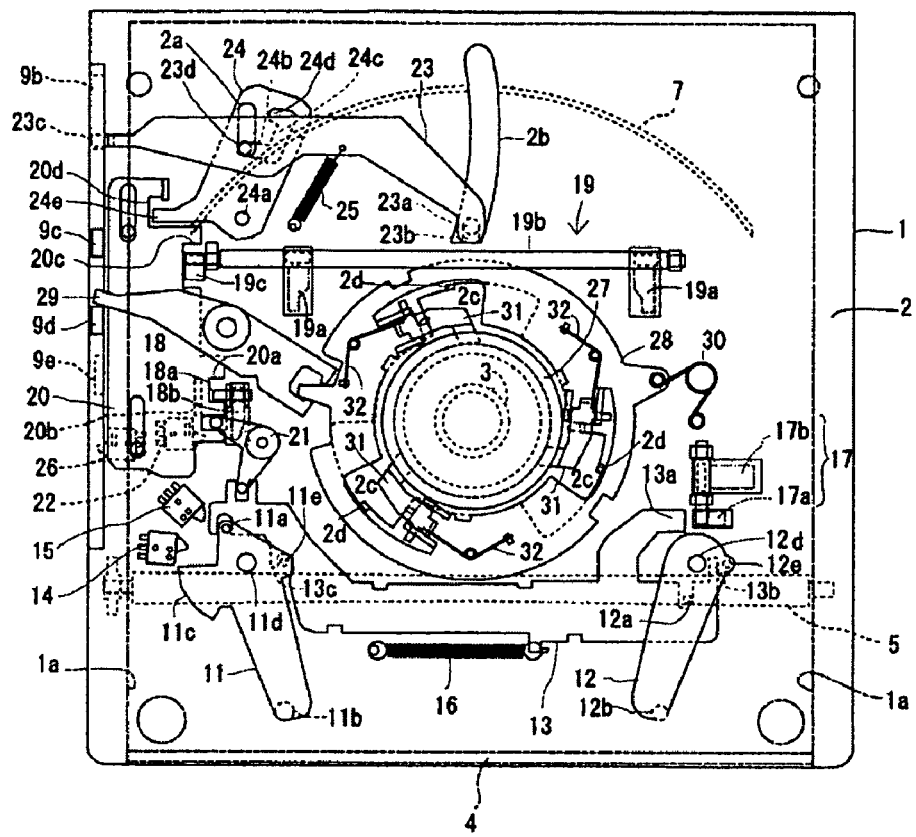
FIGS. 2A, 2B, and 2C are schematic views showing a structure of a disk player employing the disk-chucking device of FIG. 1.
Figure 2B:
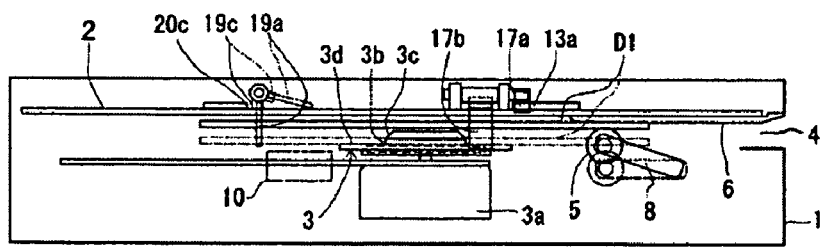
Figure 2C:
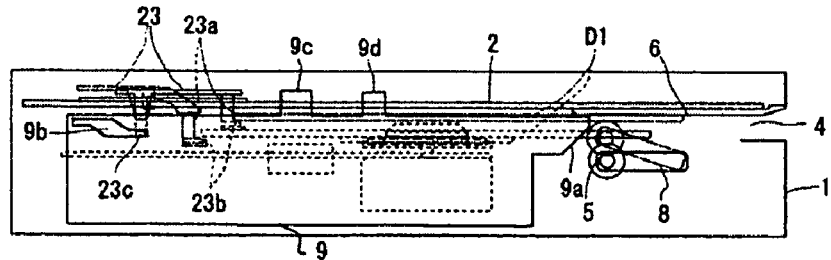

FIGS. 2A, 2B, and 2C are schematic views showing a structure of a disk player which employs the above-mentioned disk-chucking device. As shown in these figures, the mounting board 2 which covers the whole device is disposed within a housing 1 of the disk player. On the mounting board 2 are provided a detecting mechanism for detecting the size of the disk, a disk-chucking device for chucking the disk onto the disk support, a disk center locating mechanism for transmitting the disk from the entrance 4 onto the disk support, and a driving mechanism for driving a feeding roller drive mechanism. Moreover, a guide plate 6 for chucking a disk which is inserted into the entrance 4 through the feeding roller 5, and a larger disk baffler 7 are also provided on the mounting board 2.

On the other hand, the feeding roller drive mechanism is provided on a side portion of the housing. The feeding roller drive mechanism comprises a feeding roller support plate 8 for supporting the feeding roller 5, a spring (not shown) for turning the support plate 8 so that the feeding roller can abut against the guide plate 6, and a gear assembly (not shown) for transmitting power from a driving motor (not shown) to the feeding roller 5. A control plate 9 (control unit) mounted on a side surface of the housing 1 is able to be moved according to the engagement between the drive mechanism and the driving motor. The control plate 9 provides a cam 9a engaged with the feeding roller support plate 8. When the control plate 9 is moved towards the entrance by the power of the driving motor, the cam 9a can make the feeding roller 5 apart from the guide plate 6. Moreover, the housing 1 is provided with a disk support motor 3-3a for supporting the disk support, and a pickup 10. The disk support 3 has a center column 3b which can be embedded into the center hole of the disk. An inclined plane 3c is formed on a front portion of the center column for guiding the center hole of the disk to enclose the center column 3b. Furthermore, a magnetic material is provided within a carrying surface 3d which carries the disk. A loading route of the disk is defined as the route located between the entrance 4 and the larger disk baffler 7.

The disk detecting mechanism is disposed adjacent to the disk entrance 4. The disk detecting mechanism comprises a pair of detecting levers 11 and 12 which are respectively located at a right portion and a left portion of the entrance 4, a connecting plate 13 which connects the detecting lever 11 to the detecting lever 12, and a first switch 14 and a second switch 15 for transmitting an electronic signal according to a turning degrees of the detecting levers. The detecting levers 11, 12 provide two engaging pins 11a, 12a which are engaged with the connecting plate 13, and two detecting pieces 11b, 12b each of which has an end contact with a periphery of the disk. The detecting pieces 11b, 12b are disposed adjacent to the entrance 4, so that the detecting levers 11, 12 can come into contact with the periphery of the disk and then be pushed to rotate outwardly when a disk is inserted into the entrance 4. On the other hand, a motion of one of the detecting levers 11, 12 can be transmitted to the other one of the detecting levers 11, 12 through the connecting plate 13. For example, if the left detecting lever 11 itself is rotated clockwise around a turning pivot 11d, the connecting plate is moved rightward to thereby rotate the right detecting lever 12 anticlockwise. Moreover, if the right detecting lever 12 itself is rotated anticlockwise around a turning pivot 12d, the connecting plate is moved rightward to thereby rotate the left detecting lever 11 clockwise.

Furthermore, contact pins 11e, 12e are provided on the detecting levers 11, 12, respectively. A first contact part 13b for engaging or disengaging with the contact pin 12e of the right detecting lever 12 and a second contact part 13c for engaging or disengaging with the contact pin 11e of the left detecting lever 11 are provided on the connecting plate 13. The contact pins 11e, 12e are located at a straight line defined between the turning pivots 11d and 12d of the detecting levers 11, 12. In addition, there exists a certain distance between the contact pins 11e, 12e and their corresponding contact parts 13c, 13b. In this manner, the contact pin 11e will not contact with the second contact part 13c when the left detecting lever 11 is rotated clockwise. However, if the left detecting lever 11 itself is rotated clockwise which in turn drives the connecting plate 13 to move rightward, the contact pin 12e of the right detecting lever 12 will come into contact with the first contact part 13b, so as to restrict the connecting plate 13 from moving rightward, and thereby prevent the left detecting lever 11 from rotating clockwise.

On the other hand, the contact pin 12e will not contact with the first contact part 13b when the right detecting lever 12 is rotated anticlockwise. However, if the right detecting lever 12 itself is rotated anticlockwise which in turn drives the connecting plate 13 to move rightward, the contact pin 11e of the left detecting lever 11 will come into contact with the second contact part 13c, so as to restrict the connecting plate 13 from moving rightward, and thereby prevent the right detecting lever 12 from rotating anticlockwise. That is, if one of the detecting levers is rotated alone, the other one of the detecting levers will be restricted from rotating. Accordingly, the disk will not be introduced into the entrance 4 unless the disk is exactly placed at the center of the entrance 4 to make the detecting levers 11, 12 rotate simultaneous. Therefore, according to the present embodiment, the disk can be introduced into the center of the entrance and then placed onto the disk support quickly and securely.

A switch cam 11c is mounted on the left detecting lever 11. The switch cam 11c can turn on the first and the second switches 14, 15 mounted on the mounting board 2, so as to make the first switch 14 send out an electronic signal to stop the drive motor after a smaller disk is ejected out of the entrance 4, and make the second switch 15 send out an electronic signal to stop the drive motor after a larger disk is ejected out of the entrance 4. A first spring 16 which provides a force to urge the connecting plate 13 to move leftward is mounted on the connecting plate 13. Then, the connecting plate 13 can urge the left detecting lever to rotate anticlockwise and the right detecting lever to rotate clockwise through the force exerted by the first spring 16.

The smaller disk D1 center locating mechanism comprises a first guide part 17 which is mounted on the mounting board 2 close to the right detecting lever 12 and is capable of rotating freely, a second guide part 18 which is mounted on the mounting board 2 close to the left detecting lever 11 the and is capable of rotating, a smaller disk baffler 19, a sliding plate 20 for driving the smaller disk baffler 19, and a portion of the connecting plate 13. The first guide part 17 comprises a first contact piece 17a which can contact with a strip 13a of the connecting plate 13, and a first guide piece 17b located on the loading route of the disk. The first guide part 17 exerts a turning force to the first guide piece 17b through a spring (not shown) to place the first guide piece 17b on the loading route of the disk, so as to make the first contact piece 17a against the strip 13a.

The second guide part 18 comprises a second contact piece 18a which is engaged with a first protruding piece 20a of the sliding plate 20, and a second guide piece 18b located on the loading route of the disk. The second guide part 18 exerts a turning force to the second guide piece 18b through a spring (not shown) to place the second guide piece 18b on an loading route of the disk, so as to make the second contact piece 18a against the fist protruding piece 20a. The second guide piece 18b is located at a point which is slightly away from the periphery of the smaller disk D1 with respect to a cross point between the loading route of the disk and a center line of the disk support perpendicular to the loading route. The sliding plate 20 can transmit a motion of the connecting plate 13 through a joint plate 21. The sliding plate 20 comprises the first protruding piece 20a, an operating piece 20b of a third switch 22, a second protruding piece 20c engaged with the smaller disk baffler 19, and a first recess 20d engaged with the first turning plate 24 which can control a rotation of the driving plate 23 (driving part). The motor is started up as soon as the third switch 22 is turned on by the operating piece 20b.

The smaller disk baffler 19 is located on the loading route of the disk. The smaller disk baffler 19 comprises two restraining chips 19a which are contact with the periphery of the smaller disk, a turning shaft 19b for supporting the restraining chips, and a third contact piece 19c disposed against the second protruding piece 20c, when the smaller disk D1 is placed on the disk support. In addition, if the sliding plate 20 is moved, the second protruding piece 20c can press the third contact piece 19c, and the restraining chips 19a can make the turning shaft 19b rotate. In this manner, a front portion of the restraining chips 19a can be rotated in a direction towards the entrance 4, thereby departing from the loading route of the disk. Moreover, the first guide piece 17b, the second guide piece 18b, and the restraining chips 19a are disposed with a distance, which is slightly larger than a radius of the smaller disk, from the center of the disk support 3. Preferably, the larger portion between the distance and the radius of the smaller disk is equal to a moving distance needed for positioning the center hole of the disk from the inclined plane 3c of the center column 3b to the center of the disk support 3, when the center hole of the disk is embedded around the center column 3b of the disk support 3. That is, the moving distance is exactly the space for embedding the disk.

A center locating mechanism of the larger disk D2 comprises linear rails 1a which are respectively mounted on a left portion and a right portion inside the housing 1, and an arch-shaped larger disk baffler 7. The distance between the linear rails 1a is slightly larger than the diameter of the larger disk D2. In addition, the larger disk baffler 7 is mounted on a disk support for supporting the larger disk, which is slightly apart from a periphery of the larger disk with a deviated distance. Preferably, the deviated distance is equal to a moving distance needed for positioning the center hole of the disk from the inclined plane 3c of the center column 3b to the center of the disk support 3, when the center hole of the disk is embedded around the center column 3b of the disk support 3. Moreover, the linear rails 1a and the larger disk baffler 7 are used to direct the disk D2 onto the disk support during the introduction of the disk.

The drive mechanism comprises the driving plate 23 which can be rotated by abutting against the periphery of the disk when the disk is introduced onto the disk support, and the first turning plate 24 for controlling a turning pivot of the driving plate 23. A pillar 23a, which is projected into the loading route of the disk and contacts with the periphery of the introduced disk, is provided at an end of the driving plate 23. An extended piece 23b, which is engaged with a bottom surface of the disk for supporting the disk, is provided on a front portion of the driving plate 23. An extended part 23c, which is engaged with a crank aperture 9b located on the control plate 9, is provided on the other end of the driving plate 23. A turning shaft 23d, which is embedded into an elongate aperture 2a located on the mounting board 2, is provided on a center portion of the driving plate 23. In addition, a second spring 25 is attached to the driving plate 23 for exerting a weak force to urge the pillar 23a towards the entrance 4.

On the other hand, a first arch-shaped aperture through which the pillar 23a is inserted is formed on the mounting board 2. The first turning plate 24 can be rotated freely on the mounting board 2 due to the axial support by an axis 24a, so as to make the turning shaft 23d of the driving plate 23 embed into a second arch-shaped aperture 24b which is configured around the axis 24a. A linear aperture 24c that is overlapped with the elongate aperture 2a is provided at an end of the second arch-shaped aperture 24b, and a recess 24d that is parallel to the second arch-shaped aperture 24b is provided at an end of the linear aperture 24c. Moreover, a bracket 24e which is engaged with a first recess portion of the sliding plate 20 is provided on the first turning plate 24.

The crank aperture 9b of the control plate 9 is used to drive an end of the driving plate 23 to approach to the mounting board 2 and to make the driving plate 23 to rotate around the turning shaft 23d towards the introduced direction of the disk, corresponding to the movement of the control plate 9. That is, when the disk is introduced adjacent to the baffler, the pillar 23a of the driving plate 23 can abut against the periphery of the disk, and the driving plate 23 can be turned with the bottom surface of the disk supported the extended piece 23d. By virtue of the turning of the driving plate 23, the extended part 23c of the driving plate 23 abuts against a first side edge of the crank aperture 9b to move the control plate 9. At this time, the control plate 9 begins to move by the power of the driving motor. Thus, the crank aperture 9b pushes the extended part 23c up towards the mounting board 2. By such a push motion, the pillar 23a of the driving plate 23 is also turned towards the mounting board 2 around the turning shaft 23d, so that the extended piece 23b of the driving plate 23 can approach to the carrying surface 3d of the disk support 3 while supporting the bottom surface of the disk.

After the disk reaches the disk support 3, the crank aperture 9b is kept turning to drive the end of the driving plate 23 to move towards the mounting board 2 so as to make the extended piece 23b depart from the bottom surface of the disk. Then, according to the movement of the control plate 9, a second side edge of the crank aperture 9b presses the extended part 23c to drive the pillar 23a of the driving plate 23 to turn towards the introduced direction of the disk, so as to make the pillar 23a depart from the periphery of the disk. In addition, the control plate 9 further provides a first contact piece 9c and a second contact piece 9d for driving the crank mechanism, and a third contact piece 9e for turning on/off a fourth switch 26. Here, the first contact piece 9c, the crank aperture 9b and the cam 9a are configured to drive the disk to approach to the disk support, drive the feeding roller 5 to depart from the guide plate 6, and drive the pressing member 27 to approach to the disk support 3, simultaneously, while at the same time keeping the bottom surface of the disk supported by the extended piece 23b.

Referring to FIGS. 1 and 2, a resilient spring 30 is provided between the second turning plate 28 and the mounting board 2 to make the second turning plate retain at a terminal point of the turning. When the second turning plate 28 is rotated, the sliding portions 31b are slid into the second notch portions 2c of the mounting board 2, the clamping members 31 can drive the clips 31c to approach to the disk support through a force exerted by the rod spring 32. In this way, the clips 31c can approach to the disk support 3 while clasping the pressing member 27. Since the disk support 3 is filled with the magnetic materials, the disk is chucked onto the disk support 3 by means of the permanent magnet 27a within the pressing member 27. If the second turning plate 28 is kept rotating, the support shafts 31a of the clamping members 31 may come into contact with the insert 2d to cause the clips 31c of the clamping members 31 to release from the circular groove 27b of the pressing member 27, which thereby makes the rotation of the disk possible.

The introduction process of the smaller disk is described as follows.

Figure 3:
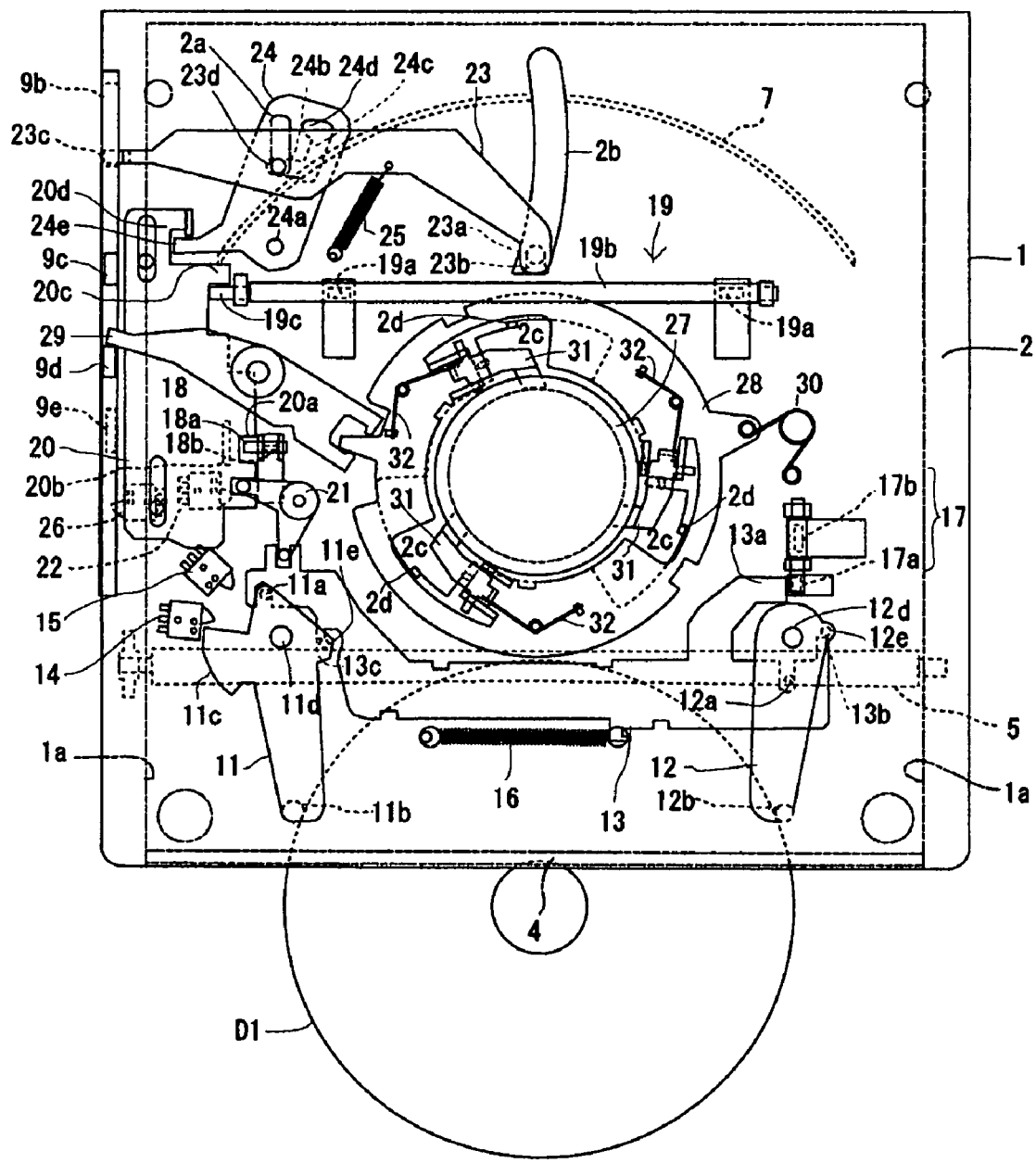
FIG. 3 is a state view of the disk player in which a smaller disk is inserted into an entrance of the disk player.

FIG. 3 is a view showing that a smaller disk is inserted into the entrance 4. The two detecting levers 11, 12 abut against the periphery of the smaller disk D1 and are turned outwards in a small amount (small turning degrees), when a front portion of the smaller disk D1 is inserted into a position between the feeding roller 5 and the guide plate 6. At this time, the connecting plate 13 is moved rightward slightly according to the turning of the detecting levers 11, 12, so that the sliding plate 20 is moved towards the entrance through the joint plate 21. According to the movement of the sliding plate 20, the third switch 22 is turned on by the operating piece 20b, so as to start up the driving motor. Thus, the feeding roller 5 is rotated to insert the smaller disk D1 into the entrance and introduce the smaller disk D1 towards the inside of the device.

On the other hand, since the connecting plate 13 is moved just in a small amount, the strip 13a will not engage with the first contact piece 17a, so that the first guide piece 17b of the first guide part 17 is located on the loading route of the disk.

Figure 4:
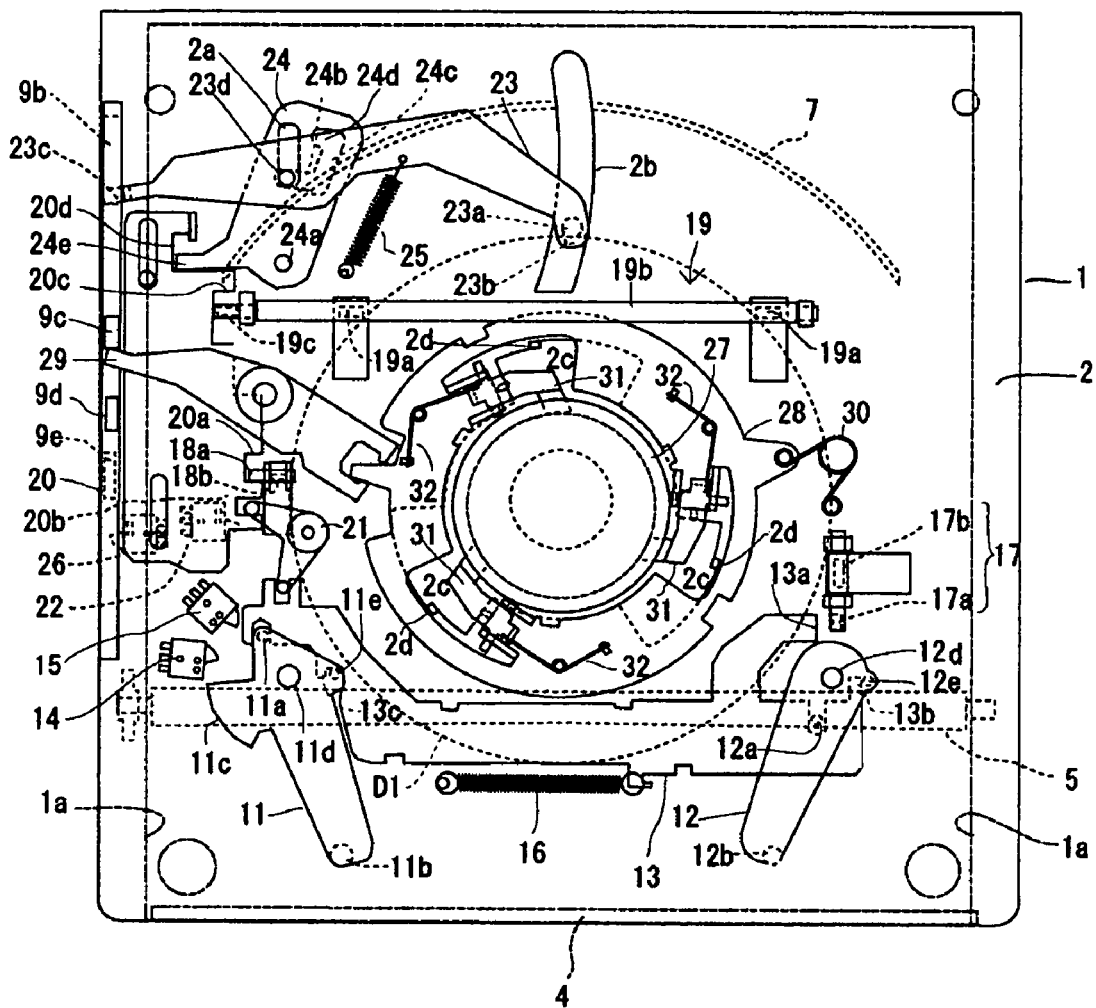
FIG. 4 is a state view of the disk player in which the smaller disk is engaged with a smaller disk baffle of the disk player.

Moreover, since the sliding plate 20 is also moved just in a small amount, the first protruding piece 20a will not engage with the second contact piece 18a. Thus, the second guide piece 18b of the second guide part 18 is located on the loading route of the disk. At this time, the clamping members 31 mounted on the second turning plate 28 clasping the pressing member 27 is restrained in a clamping position by the resilient spring 30, and the pressing member 27 is raised above center column 3b of the disk support 3 by the clips 31c of the clamping members 31 for that the sliding portions 31b are contact with the mounting board 2. Thus, the smaller disk D1 will not contact with the pressing member 27 but be placed in a position between the pressing member 27 and the disk support3 (as shown in FIG. 4) due to the guide of the first guide part 17 and the second guide part 18. On the other hand, the center of the pressing member 27 is in alignment with the center column 3b of the disk support 3.

Figure 5A:
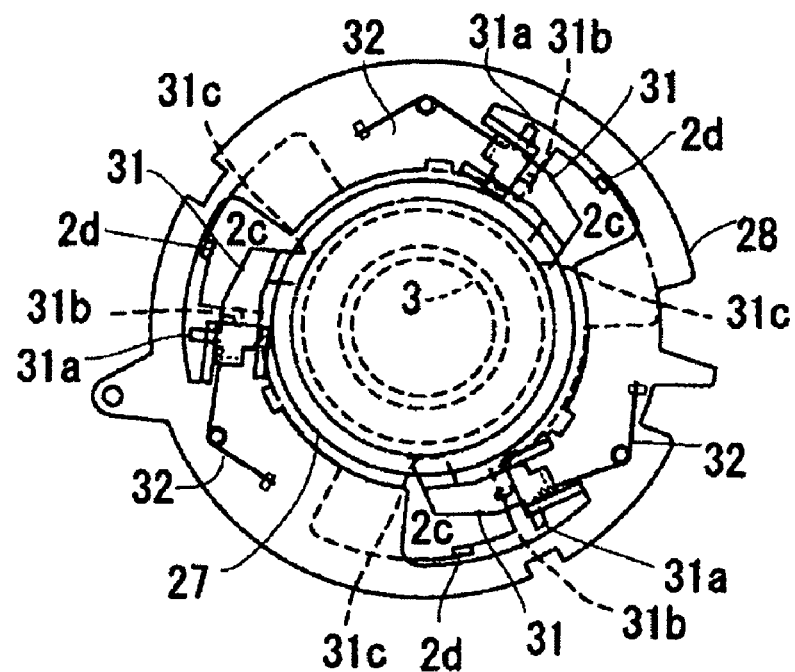
FIGS. 5A and 5B are state views in which a smaller disk is not chucked during an operation of loading the smaller disk.
Figure 5B:
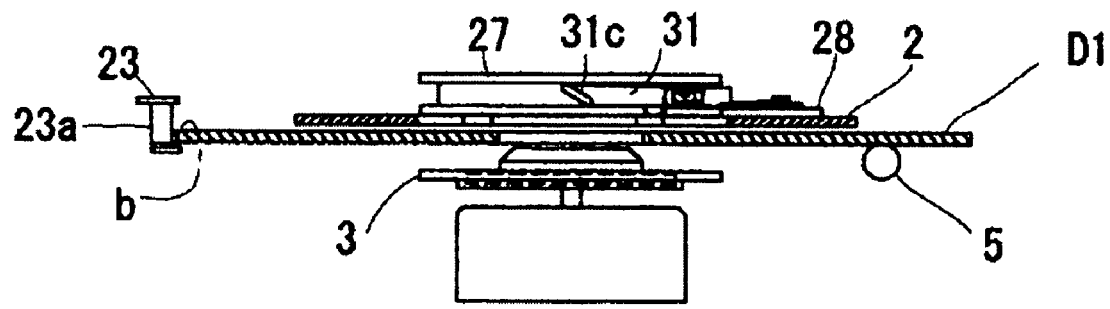

FIG. 5 shows that a smaller disk D1 is introduced in such a position that a periphery of the disk D1 is contact with the restraining chips 19a of the smaller disk baffler 19. At this time, the turning shaft 23d of the driving plate 23 is positioned at an immovable state according to the elongate aperture 2a and the second arch-shaped aperture 24b. In addition, the front portion of the smaller disk D1 presses the pillar 23a of the driving plate 23 to drive the driving plate 23 to turn anti-clockwise around the turning shaft 23d, so that the extended part 23c can press a side edge the crank aperture 9b of the control plate 9 to move the control plate 9 towards the entrance. Moreover, the driving motor can provide a power to facilitate the movement of the control plate 9. Then, the first contact piece 9c of the control plate 9 is engaged with the swivel plate 29 to rotate the swivel plate 29 anti-clockwise so as to rotate the second turning plate 28 clockwise through the first connecting member 28d. At the same time, the bottom surface of the smaller disk is supported by the extended piece 23b as shown in FIG. 5.

The cam 9a is engaged with the feeding roller support plate 8 for guiding the feeding roller 5 apart from the guide plate 6, while the second turning plate 28 is turning. At the same time, the crank aperture 9b causes the pillar 23a of the driving plate 23 to rotate close to the mounting board 2. According to the rotation of the driving plate 23, the extended piece 23b can move in a direction same to the moving direction of the feeding roller 5 while supporting the bottom surface of the smaller disk D1.

Figure 6A:
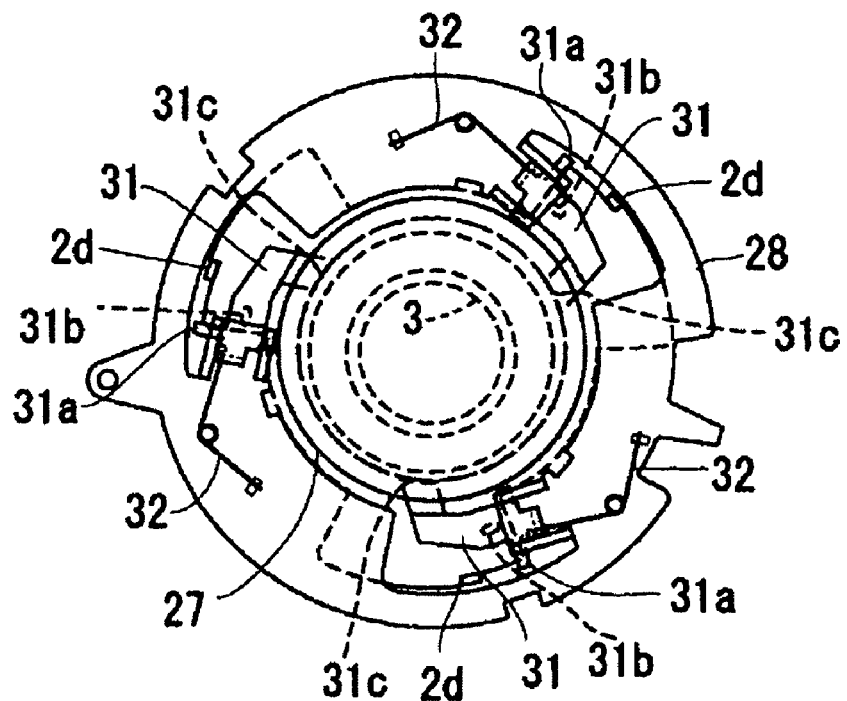
FIGS. 6A and 6B are state views in which a smaller disk is chucked.
Figure 6B:
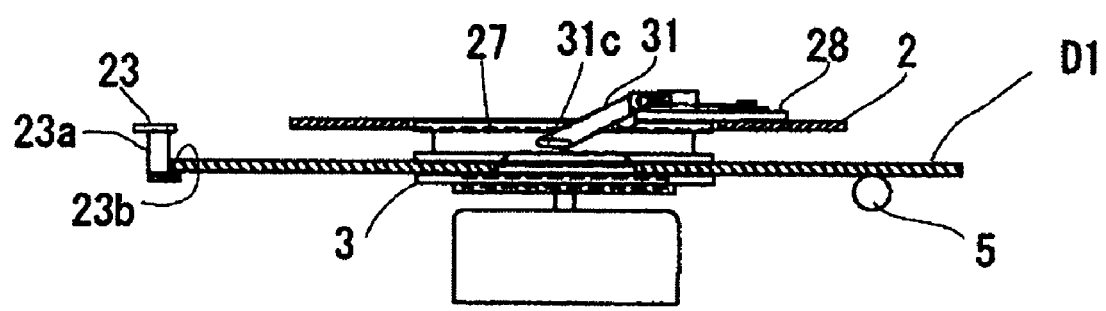

Moreover, the sliding portions 31b of the clamping members 31 are slid into the second notch portions 2c of the mounting board 2 as the second turning plate 28 rotates. And then, the clips 31c of the clamping members 31 cause the smaller disk and the pressing member 27 to approach to the disk support 3 simultaneously under the action of the rod spring 32 as shown in FIG. 6. At this time, the center of the pressing member 27 is aligned with the center of the disk support 3 as the clamp member is moved close to the disk support 3 by means of the clamping members 31. In the meantime, the smaller disk is positioned onto the disk support 3 according to the guide of the two restraining chips 19a located in the inner side of the device, and the first guide piece 17b and the second guide piece 18b separately located at the left and the right of the disk support. Thus, the smaller disk D1 can be correctly positioned onto the disk support 3 by means of the extended piece 23b, the pressing member 27 and the feeding roller 5, even if the feeding roller 5 is released from the guide plate 6.

Figure 7:
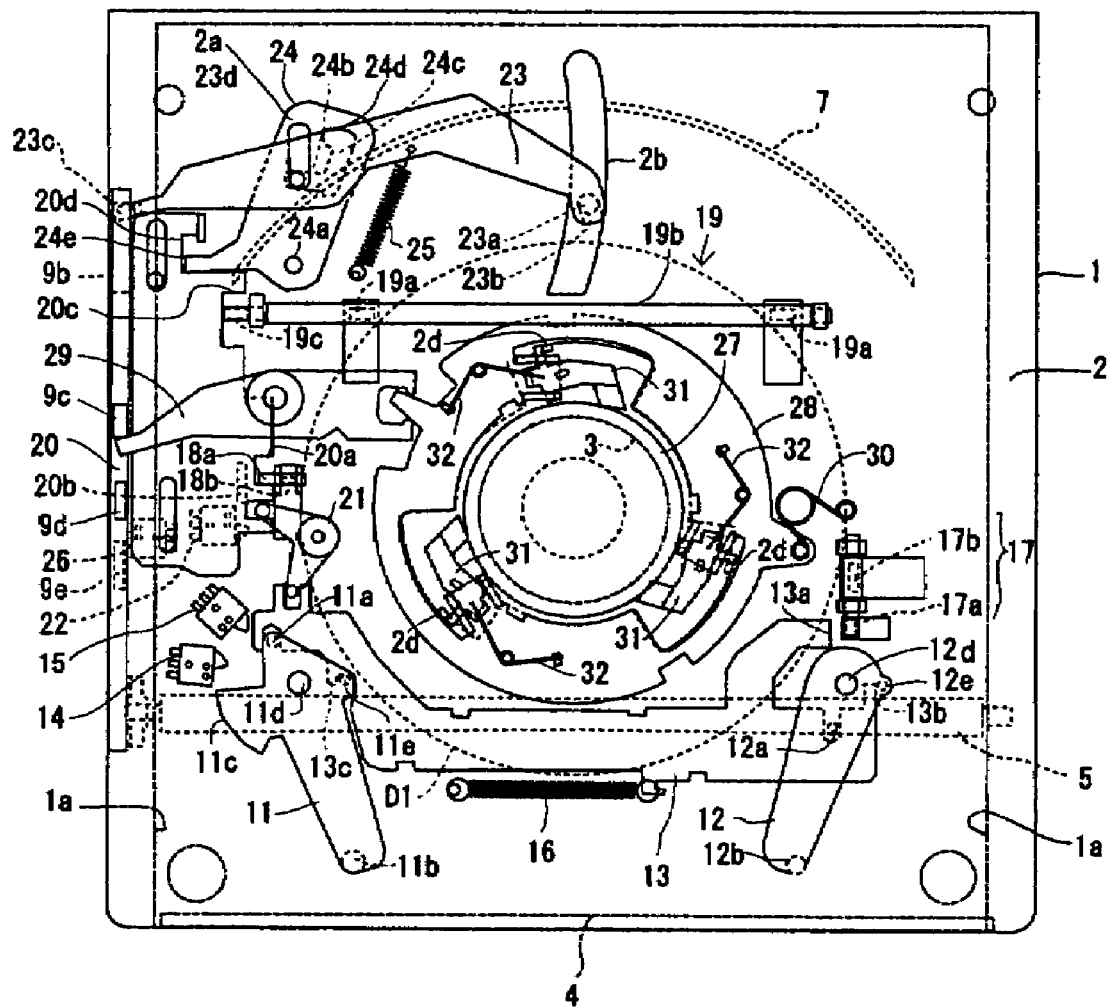
FIG. 7 is a state view of the disk player in which the smaller disk is in a play situation.
Figure 8A:
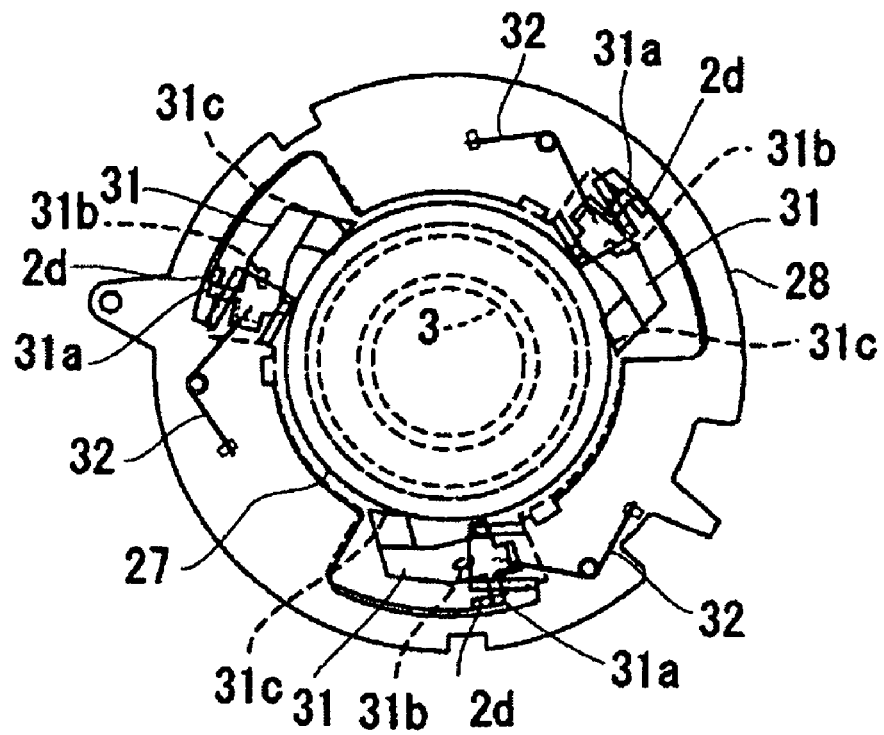
FIG. 8 is a state view in which the smaller disk is chucked and disengaged from a feeding roller 5 and a driving plate 23.
Figure 8B:
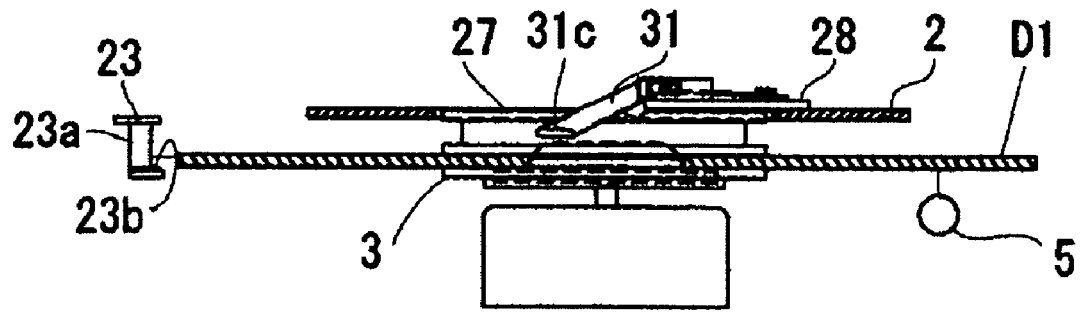

FIG. 7 shows that the smaller disk is in a play situation. The smaller disk D1 can be secured on the disk support by the permanent magnet within the clamp member27. When the smaller disk D1 is introduced to the inclined plane 3c engaging with the center column of the disk support 3, the smaller disk can be slightly moved towards the entrance due to the inclined plane 3c, so that the periphery of the smaller disk is apart from the baffler 19a. In addition, the extended part 23c is pushed towards another side of the crank aperture 9b, the driving plate 23 continues to rotate anti-clockwise, so that the pillar 23a is completely released from the periphery of the smaller disk. Moreover, as shown in FIG. 8, the feeding roller 5 and the extended piece 23b are also released from the bottom surface of the smaller disk D1, which will not hinder the rotation of the smaller disk D1.

Moreover, as the second turning plate 28 rotates, the support shafts 31a come into contact with the insert 2d of the mounting board 2, and then, the insert 2d can press the shafts 31a to further rotate the clamping members 31 anti-clockwise around the fixing hole 28b. After that, the clips 31c of the clamping members 31 are released from the circular groove 27b, so that the pressing member 27 is able to rotate together with the disk support. In addition, the resilient spring 30 is compressed when the second turning plate 28 is rotated clockwise, so that the second turning plate 28 and the clips 31c of the clamping members 31 can be released from the circular groove 27b under the resilient force of the resilient spring 30. After that, the third contact piece 9e can turn off the fourth switch 26 to further stop the driving motor.

As stated above, the smaller disk D1 is introduced onto the disk support 3 according to the guide of the two restraining chips 19a located in the inner side of the device, and the first guide piece 17b and the second guide piece 18b separately located at the left and the right of the disk support, so that the smaller disk D1 can be correctly positioned onto the disk support 3, even if the feeding roller 5 is released from the guide plate 6. In addition, the pressing member 27 and the disk support may comprise permanent magnets, respectively, so that the disk can be secured on the disk support according to a magnetic force between the magnets. Accordingly, the introduction of the disk can be performed securely regardless of the position of the disk player.

Moreover, the restraining chips 19a, the first guide piece 17b, and the second guide piece 18b will not be moved during the introduction of the smaller disk, so that the disk-chucking device of the present invention is relatively simple in configuration.

The introduction process of the larger disk is described as follows.

Figure 9:
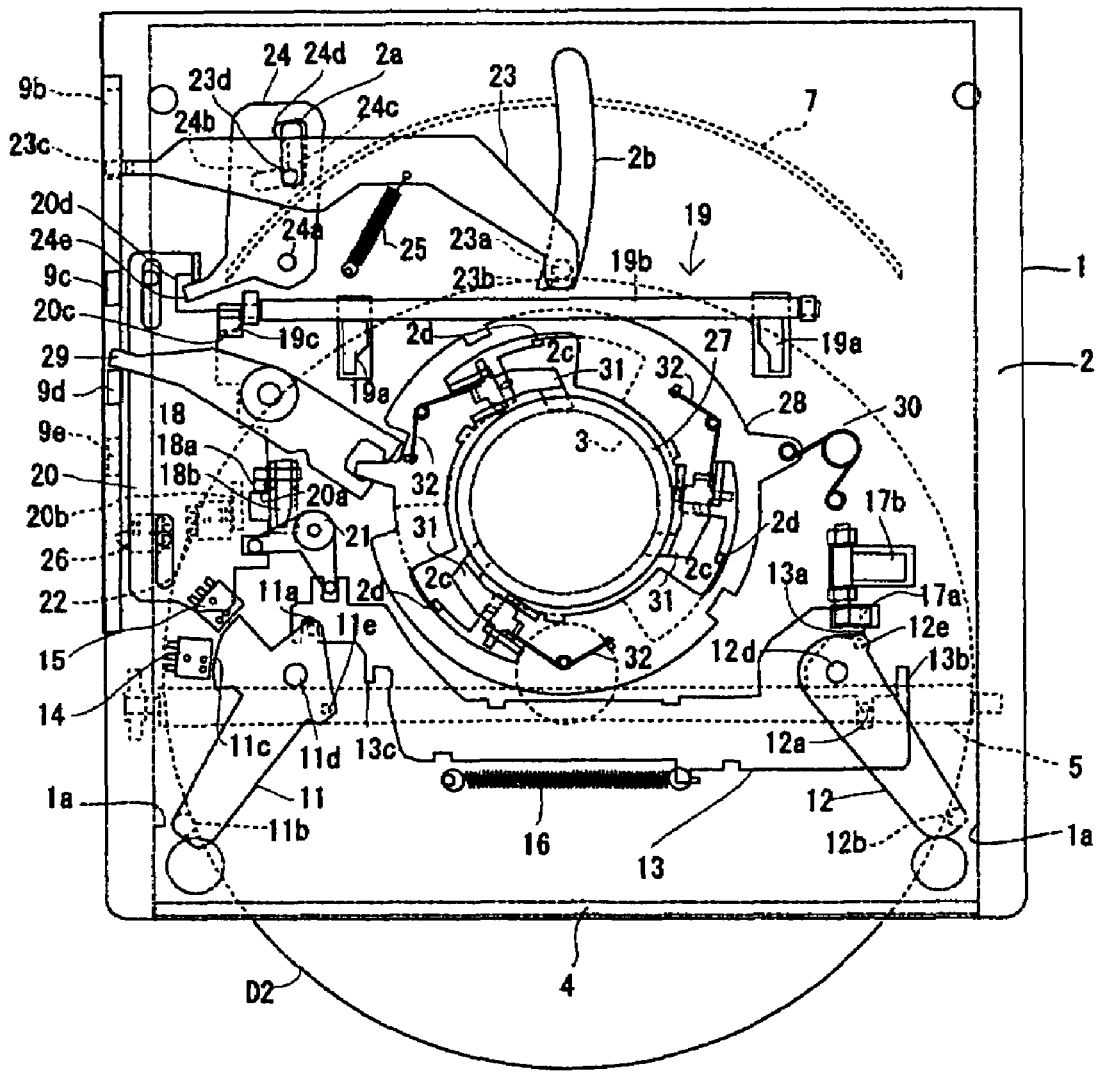
FIG. 9 is a state view of the disk player in which a larger disk is inserted into an entrance of the disk player.

FIG. 9 shows that a larger disk D2 is inserted into the entrance 4 through the feeding roller 5. The two detecting levers 11, 12 abut against the periphery of the larger disk D2 so that the detecting levers 11, 12 can be turned in a great amount (large turning degrees). Thus, the connecting plate 13 is also moved in a great amount, so that the strip 13a can engage with the first contact piece 17a to rotate the fist guide part 17 and make the first guide piece 17b retreat from the loading route of the disk. Moreover, the sliding plate 20 is also moved in a great amount so that the first protruding piece 20a can engage with the second contact piece 18a, which rotates the second guide part 18 to further make the second guide piece 18b retreat from the loading route of the disk. Furthermore, as the sliding plate 20 is moved greatly, the second protruding piece 20c can engage with the third contact piece 19c to rotate the smaller disk baffler 19 so as to make the restraining chips 19a retreat from the loading route of the disk. And then, the first recess 20d of the sliding plate 20 can engage with the bracket 24e of the first turning plate 24 to thereby rotate the first turning plate 24 anti-clockwise around the axis 24a. According to the rotation of the first turning plate 24, the turning shaft 23d of the driving plate 23 is located at a cross point of the second arch-shaped aperture 24b and the linear aperture, which thereby comes into a movable state. And then, the driving plate 23 is turned around a contact point of the extended part 23c and the crank aperture 9b, while the turning shaft 23d is moved within the linear aperture 24c and the elongate aperture 2.

Figure 10:
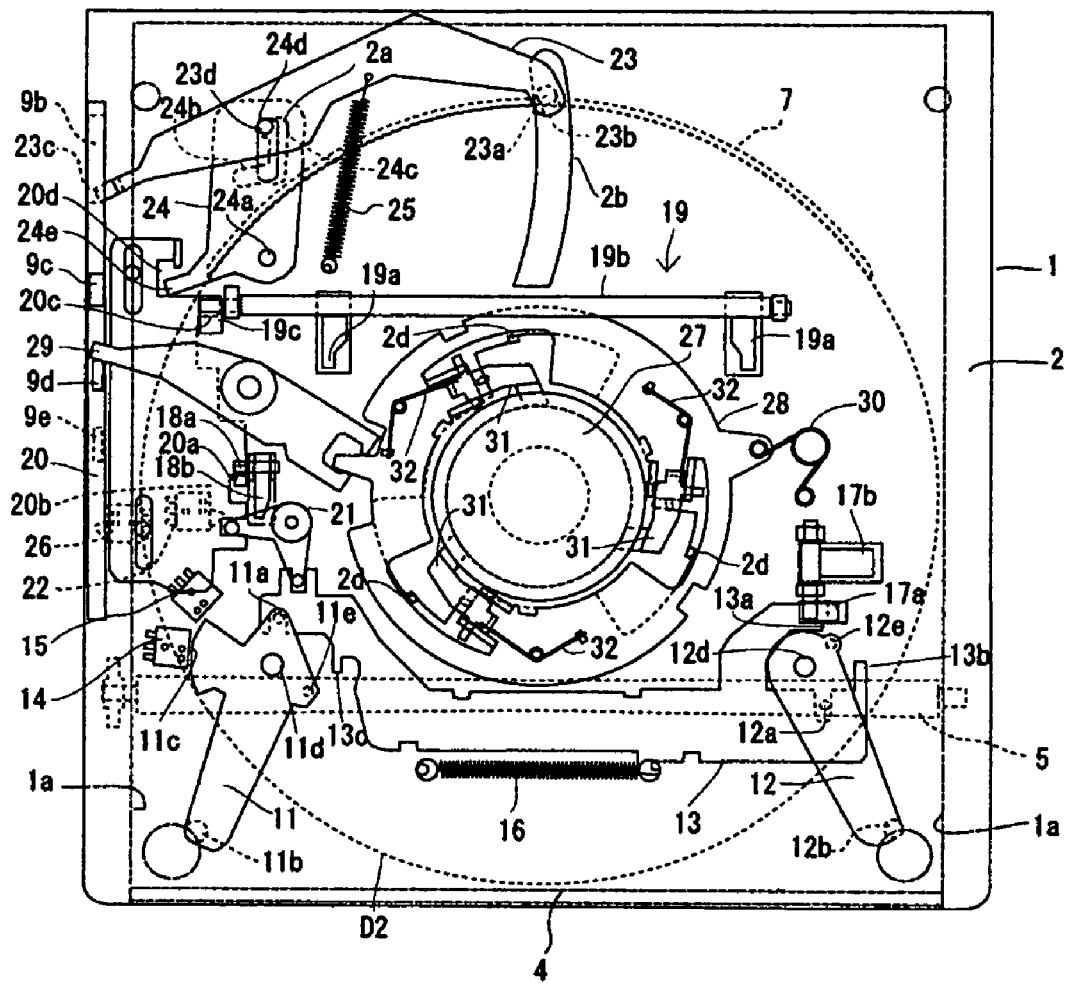
FIG. 10 is a state view of the disk player in which the larger disk is engaged with a larger disk baffle of the disk player.

FIG. 10 is a view showing that the larger disk D2 is engaged with the larger disk baffle 7. Here, the bracket 24e is employed to restrict the return of the sliding plate 20 by using the engagement between the turning shaft 23d and the recess 24d of the first turning plate 24. Thus, the left and right detecting levers 11, 12 is kept at a position after turning a great range, so that the left and right detecting pieces 11b, 12b can release from the periphery of the larger disk D2. On the other hand, the turning shaft 23d is contact with an end of the elongate aperture 2a and the driving plate 23 is turned anti-clockwise, so that the control plate 9 is moved towards the entrance 4. During the movement of the control plate 9, the power from the driving motor is transmitted to the control plate 9 to continuously move the control plate 9 towards the entrance 4. After that, the larger disk is chucked onto the disk support by the clamp member, which is similar to the introduction of the smaller disk. And then, the fourth switch 26 is turned off by the third contact piece 9e so as to stop the driving motor.

According to the present invention, the detecting levers 11, 12 further provide the contact pins 11e, 12e, respectively, and the connecting plate 13 further provide a first contact part 13b and a second contact part 13c for respectively engaging and disengaging with the contact pins 11e, 12e. In this way, the disk can be inserted into the entrance and introduced onto the disk support quickly and securely, only by locating the contact pins 11e, 12e at a straight line defined between the turning pivots 11d, 12d of the detecting levers 11, 12 before turning the detecting lever 11, 12.

Moreover, the disk-chucking device comprises the pressing member 27, the second turning plate 28 which is secured on the center of the mounting board 2 and capable of turning, the swivel plate 29 for transmitting the motion of the control plate 9 to the second turning plate 28 through the first contact piece 9c, the resilient spring 30 for keeping the second turning plate at a terminal point of the turning, three clamping members 31 which are mounted on the second turning plate 28 through the support shafts 31a, and the rod spring 32 for providing a force to urge a clip 31c of each clip to clasp the circular groove 27b and another force to urge the pressing member 27 to approach to the disk support. When using the disk-chucking device of the present invention, the clamp member is moved close to the disk support while keeping the center of the clamp member consistent with the center of the disk support, after that the disk is located onto the disk support, then the clamp member is released from the chucking state. Thus, the present disk-chucking device can chuck the disk securely regardless of the position of the disk player. In addition, the clamp member will be kept at an immovable state by the clips if the disk is not chucked, so that there is no noise generated even if the disk player is subjected to somewhat vibration. Moreover, the disk-chucking device of the present invention is suitable for disks with different sizes.

Figure 11:
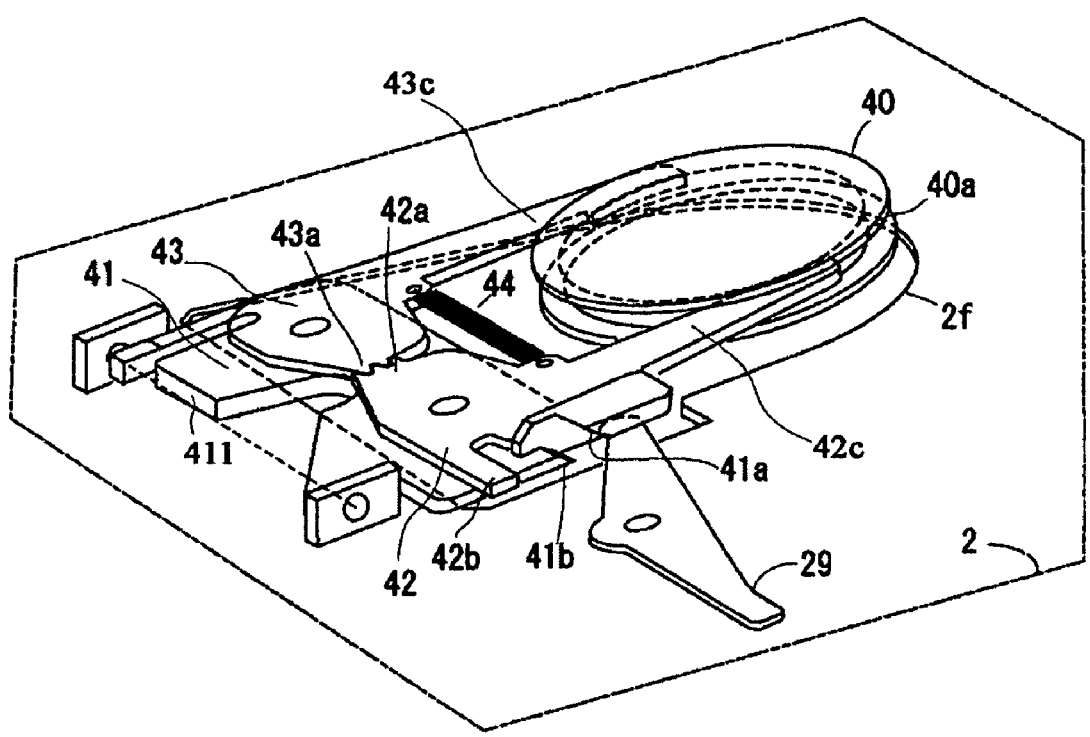
FIG. 11 is a perspective view of a disk-chucking device according to a second embodiment of the present invention.

FIG. 11 is a perspective view of the disk-chucking device according to another embodiment of the present invention. The present embodiment 2 can also be employed in the above-mentioned disk player.

As shown in FIG. 11, the disk-chucking device of the embodiment 2 comprises a pressing member 40 including a circular groove 40a which is provided around a circumference of the pressing member 40, and a turning plate 41 having a rear portion 411 thereof mounted on the mounting board 2. The turning plate 41 is able to be turned around the rear portion 411. A first connecting member 41a and a second connecting member 41b which are located on a side portion of the turning board 41 are engaged with a swivel plate 29 connected to the mounting board 2. The swivel plate 29 is also engaged with a control part 9 of the disk player so as to provide a force driving the turning plate 41 to rotate around the rear portion 411 of the turning plate 41.

Two clamping members 42, 43 which can be turned are provided on the turning board 41. Two clips 42c, 43c are respectively provided on the clamping members 42, 43 for clasping the pressing member 40. The clamping members 42 and 43 are engaged with each other through toothed portions 42a and 43a thereof. If the clip 42c of the clamping member 42 is released from the pressing member 40, then the clip 43c of the clamping member 43 will also be released from the pressing member 40 according to the engagement of the toothed portions 42a and 43a, and vice versa. An elastic part 44 is mounted between the clamping members 42 and 43 for providing a force so that the clips 42c, 43c of the clamping members 42, 43 can clasp the circular groove 40a of the pressing member 40. A third connecting member 42b is provided on the clamping member 42. When the swivel plate 29 is turned anti-clockwise to press the third connecting member 42b, the clamping members 42, 43 will be released from the pressing member 40.

The first connecting member 41a is configured to engage with the swivel plate 29 so that the front portion of the turning plate 41 can be turned upwardly around the rear portion 411. The second connecting member 41b is configured to engage with the swivel plate 29 so that the front portion of the turning plate 41 can be turned downwardly around the rear portion 411. In this way, the pressing member clasped by the clamping members 41 and 42 can be moved vertically through a through hole 2f provided on the mounting board 2 corresponding to the rotation of the swivel plate 29. For example, the second connecting member 41b may be an inclined groove receiving an end of the swivel plate 29, so that the turning plate 41 can be turned around the rear portion thereof when the end of the swivel plate 29 is slid within the inclined groove.

According to the disk-chucking device of the embodiment 2, the swivel plate 29 is engaged with the first connecting member 41a to locate the front portion of the turning plate 41 above the mounting board 2 before loading the disk, so that the clamping members 42, 43 can clasp the pressing member 40 above the mounting board. Moreover, when the swivel plate 29 is engaged with the second connecting member 41b, the second connecting member 41b can be turned to further drive the front portion of the turning plate 41 to turn close to the mounting board 2, so that the clamping members 42, 43 mounted on the turning plate 41 can clasp the pressing member 40 to approach to the disk support under the mounting board 2.

As the swivel plate 29 is rotated anti-clockwise, the pressing member 40 is pressed onto the center column of the disk support. Then, the swivel plate 29 is engaged with and presses the third connecting member 42b of the clamping member 42, thereby causing the clips 42c, 43c of the clamping members 42, 43 to rotate outwards through the engagement of the toothed portions 42a and 43a. In this way, the clips 42c, 43c can be released from the circular groove 40a, so that the pressing member 40 is able to be turned freely. In addition, the pressing member 40 and the disk support may comprise permanent magnets, respectively, so that the disk can be secured on the disk support according to a magnetic force between the magnets. According to the second embodiment of the invention, the disk-chucking device employs two clamping members 42 and 43 to clasp the pressing member 40, which has a relatively simple configuration.

The present invention can be used not only in a household disk player, but also in a car disk player. Moreover, the disk-chucking device of the present invention can chuck disks with different sizes onto a disk support securely.

The invention claimed is:

1. A disk-chucking device used for a disk player, comprising:
    a pressing member providing a first through hole at the center thereof and a circular groove at the side thereof;
    a turning plate having a second through hole at the center thereof which allows the pressing member passing through, and a plurality of first notch portions disposed along the circumference of the second through hole;
    a plurality of clamping members mounted on the turning plate at the notch portions respectively, each of the clamping members providing a clip to removably clamp the circular groove of the pressing member; and
    a mounting board disposed at an upper portion of the disk player, providing a third though hole at its center which is aligned with the second through hole, and defining a plurality of second notch portions to receive the clamping members respectively;
    wherein the turning plate is slidably connected to the mounting board through the clamping members, the turning plate can rotate with respect to the mounting board, and the pressing member can be pressed onto and removed from a disk support of the disk player according to the rotation of the turning plate; and
    wherein the turning plate comprises a plurality of supporting portions, a sliding portion of each of the clamping members is disposed on the supporting portion through a shaft of a clamping member, one end of the sliding portion is connected to the clip extending inwards and another end of the sliding portion is connected to an elastic portion which is mounted on the turning board; and
    wherein each of the supporting portions comprises a first guadrate support and a second quadrate support, the first quadrate support provides a fixing hole and the second guadrate support provides a channel, and the shaft of the clamping member is inserted into the fixing hole and the channel so that the sliding portion is movable in a direction of the movement of the turning plate.

2. The device of claim 1, wherein the turning plate further provides a first connecting member disposed at a periphery thereof with which the turning plate is engaged to a swivel plate of the disk player, so that the turning plate can be turned by controlling a rotation of the swivel plate.

3. The device of claim 1, wherein the turning plate further provides a second connecting member at a periphery thereof, the second connecting member is connected to an elastic member mounted on the mounting board.

4. The device of claim 1, wherein an insert is provided extended upwards from the fringe of the second notch portion, the insert is inserted into the first notch portion, and when the turning plate rotates to a place, the insert is barred by the shaft so that the sliding member can release the pressing member onto the disk support.

5. The device of claim 1, wherein magnets are disposed in the pressing member and the disk support respectively, so that the disk can be secured on the disk support according to a magnetic force between the magnets.

* * * * *

UNITED STATES PATENT AND TRADEMARK OFFICE
CERTIFICATE OF CORRECTION

| | |
|---|---|
| PATENT NO. | : 7,669,211 B2 |
| APPLICATION NO. | : 11/377880 |
| DATED | : February 23, 2010 |
| INVENTOR(S) | : Yung Ta Chen |

It is certified that error appears in the above-identified patent and that said Letters Patent is hereby corrected as shown below:

In the Title Page, Item 54, after the word "DISC" delete "FORM" and add --FROM--.

Column 1, Line 1, after the word "DISC" delete "FORM" and add --FROM--.

Signed and Sealed this

Thirteenth Day of April, 2010

David J. Kappos
*Director of the United States Patent and Trademark Office*